United States Patent [19]

Land et al.

[11] Patent Number: 4,895,769
[45] Date of Patent: Jan. 23, 1990

[54] METHOD FOR PREPARING LIGHT POLARIZER

[75] Inventors: Edwin H. Land, Cambridge; Anthony J. DiRocco, Billerica; Leonard Polizzotto, Stow, all of Mass.

[73] Assignee: Polaroid Corporation, Cambridge, Mass.

[21] Appl. No.: 230,468

[22] Filed: Aug. 9, 1988

[51] Int. Cl.$^4$ .................. B29C 55/10; B32B 27/08
[52] U.S. Cl. ....................... 428/483; 264/1.3; 264/78; 264/134; 264/290.2; 428/522; 428/910
[58] Field of Search ............ 264/1.3, 290.2, 78, 264/134; 428/522, 910, 483

[56] References Cited

U.S. PATENT DOCUMENTS

| | | |
|---|---|---|
| RE. 23,297 | 11/1950 | Hyman, Jr. et al. . |
| 2,237,567 | 4/1941 | Land . |
| 2,328,219 | 8/1943 | Land . |
| 2,375,963 | 5/1945 | Thomas . |
| 2,445,555 | 7/1948 | Binda . |
| 3,627,579 | 12/1971 | Heffelfinger . |
| 4,166,871 | 9/1979 | Schuler ........................ 427/163 |
| 4,293,585 | 10/1981 | Imada et al. .................. 427/40 |
| 4,388,375 | 6/1983 | Hopper et al. ................ 428/423 |
| 4,476,189 | 10/1984 | Posey et al. .................. 428/336 |
| 4,592,623 | 6/1986 | Yamamoto et al. ........... 350/397 |
| 4,659,523 | 4/1987 | Rogers et al. ................ 264/1.3 |

Primary Examiner—James Lowe
Attorney, Agent, or Firm—Louis G. Xiarhos

[57] ABSTRACT

A stainable polymeric sheet material adapted to the production of a light polarizer therefrom is provided by a method, according to which, a support sheet of amorphous polymeric material is uniaxially stretched in a first direction (at or above the glass transition temperature of the polymeric support material), a layer of polyvinyl alcohol (PVA) is coated from an aqueous PVA-containing composition onto the uniaxially stretched support material, and the PVA-coated uniaxially stretched polymeric sheet material is stretched along a second direction, at an angle within about ±60 degrees to a normal to the first direction of stretch. The method provides a material which can be converted, by incorporation of visible dichroism into the PVA layer, to a light polarizer which combines efficient light polarizing properties and good mechanical strength and resistance to fracture along the stretch directions.

22 Claims, 1 Drawing Sheet

METHOD FOR PREPARING LIGHT POLARIZER

BACKGROUND OF THE INVENTION

This invention relates to a light-polarizing material and to a method for preparing a light-polarizing material. More particularly, it relates to a simple and effective method for preparing a light polarizer which exhibits desirable light-polarizing properties and good mechanical strength.

The production of linear light polarizers has been well described in the art. Linear light polarizers, in general, owe their properties of selectively passing radiation vibrating along a given electromagnetic radiation vector (and absorbing electromagnetic radiation vibrating along a second given electromagnetic radiation vector) to the anisotropic character of the transmitting medium. Dichroic polarizers are linear polarizers of the absorptive variety and owe their light-polarizing capabilities to the vectorial anisotropy of their absorption of incident lightwaves. Light entering a dichroic medium encounters two different absorption coefficients— one low and one high. The emerging light vibrates predominantly in the direction of low absorption.

The most widely used type of synthetic polarizer (and a type of polarizer to which the present invention is directed) is the polyvinyl alcohol-iodine complex polarizer. It consists of linear polyiodide contained within a polyvinyl alcohol matrix. By orienting the polyvinyl alcohol matrix unidirectionally, the transition moments of the absorbers are also so oriented and the material becomes visibly dichroic. The manufacture of iodine-stained dichroic light-polarizing elements has been described in numerous patents, including U.S. Pat. No. 2,237,567 (issued Apr. 8, 1941 to E. H. Land). Various improvements in methods for the production of light polarizers and in the light-polarizing properties thereof have also been described, for example, in U.S. Pat. No. 2,375,963 (issued May 15, 1945 to Alexander Thomas); in U.S. Reissue Pat. No. 23,297 (reissued Nov. 28, 1950 to M. Hyman, Jr., et al.); and in U.S. Pat. No. 4,166,871 (issued Sept. 4, 1979 to N. W. Schuler).

In the production of polarizers of the aforementioned type, it is common to first cast a sheet or film of polyvinyl alcohol (PVA) from an aqueous solution of the material and to heat the dried cast sheet to a temperature at which it can be extended by uniaxial stretching, to so orient the PVA as to permit orientation of the light-absorbing species to be subsequently incorporated therein. Typically, the PVA sheet will be uniaxially stretched to between 3.5 and 4 times its length. Inasmuch as the oriented (stretched) sheet assumes a somewhat fibrous nature and a diminished tensile strength in the direction transverse to the direction of stretch, it is common to bond the stretched PVA sheet to a sheet of supporting material. The supporting sheet is generally a transparent sheet of suitable isotropic material which provides dimensional stability for the PVA sheet and which serves as a cover or protective element for the completed polarizer. Cellulosic materials such as cellulose acetate butyrate, cellulose acetate and cellulose triacetate are suitable for these purposes. The supported sheet of oriented PVA can then be stained with iodine solution or otherwise rendered visibly dichroic by the use of methods known in the art.

The use of a support material for the oriented (stretched) PVA sheet material necessitates that each of the PVA and support sheets be first separately manufactured and that the resulting sheet elements be bonded or laminated in a separate laminating operation, using a suitable adhesive bonding material. It has been disclosed in U.S. Pat. No. 4,659,523 (issued Apr. 21, 1987 to J. H. Rogers, et al.) that an iodine stainable polyester polarizer film can be provided by a process involving the uniaxial stretching of a melted and extruded polyester web carrying an anchor coating and a coating of PVA coated from a dispersed aqueous composition of PVA. Such a process obviates the separate production of a sheet of PVA which would then need to be laminated to the support sheet material.

A light polarizer prepared by a method which involves the application of a stainable coating of PVA (from an aqueous solution of PVA) onto a support sheet prior to simultaneous uniaxial orientation (stretching) of the PVA and support sheet, has been found to produce a light polarizer which is characterized by poor physical properties. While such a polarizer exhibits satisfactory optical (light-polarizing) properties, the plastic light polarizer is readily fractured upon attempts to bend, fold or crease the polarizer material. Fracturing is observed along the direction of stretching, effectively negating the use of the polarizer where rough handling or product abuse is likely to be encountered.

SUMMARY OF THE INVENTION

It has been found that an optically efficient light polarizer exhibiting desirable physical characteristics, particularly resistance to bending-induced cracking and fracture, can be obtained by a simple and convenient method. Moreover, the advantages of mechanical strength and good light-polarizing properties are obtained by a manufacturing method which is not dependent upon the pre-manufacture of a cast or otherwise formed sheet or film of polyvinyl alcohol (PVA). According to a method aspect of the present invention, there is provided a method for preparing a stainable sheet article useful in the manufacture of a light polarizer, the method comprising the steps of providing a support sheet of amorphous polymeric material; uniaxially stretching the amorphous polymeric support sheet in a first direction at a temperature at or above the glass transition temperature of the polymeric support sheet material, to partially orient the polymeric support sheet material along the first direction; applying a coating of an aqueous polyvinyl alcohol-containing composition to the surface of the uniaxially stretched polymeric support sheet; and stretching the PVA-coated uniaxially stretched polymeric support sheet at a temperature at or above the glass transition temperature of the polymeric support sheet material and in a second direction of stretch; the second direction of stretch being at an angle within about ±60 degrees from a normal to the first direction of stretch; the amount of stretch along the first direction being sufficient to impart to the polymeric support sheet, resistance to stress-induced fracture along said direction, and the amount of stretch along the second direction being sufficient to simultaneously orient the molecules of polyvinyl alcohol and thereby adapt the layer to incorporation of visible dichroism and to impart to the support layer, resistance to stress-induced fracture along the second direction.

In an article aspect, the present invention provides a stainable polymeric sheet article adapted to the production of a light polarizer by the incorporation of visible dichroism, the polymeric sheet article comprising: a biaxially oriented polymeric support carrying a coated layer of PVA; the biaxially oriented polymeric sheet having biaxial orientation which results, in part, from the uniaxial stretching of an amorphous polymeric support sheet prior to the application of the coated PVA layer thereon, the uniaxial stretching being along a first direction, and, in part, as an incident to the subsequent stretching and orientation along a second direction, of the coated PVA layer carried on the uniaxially stretched polymeric support sheet; the stretching of the coated PVA layer along the second direction being at an angle within about ±60 degrees from a normal to the stretching along the first direction; the amount of stretch along the first direction being sufficient to impart to the polymeric support sheet, resistance to stress-induced fracture along such direction, and the amount of stretch along the second direction being sufficient to simultaneously orient the molecules of the PVA layer and thereby adapt the layer to incorporation of visible dichroism, and to impart to the support layer, resistance to stress-induced fracture along the second direction. Such an article, by resort to known methods for the incorporation of visible dichroism into an oriented polyvinyl alcohol layer, can be readily manufactured into an efficient light polarizer having good physical properties.

For a fuller understanding of the nature and objects of the present invention, reference should be had to the following detailed description taken in conjunction with the accompanying drawings.

DETAILED DESCRIPTION OF THE INVENTION

Figure 1:
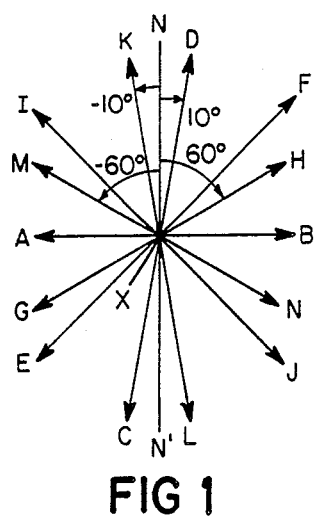
FIG. 1 is a diagrammatic representation of the relationship between first and second directions of stretch employed according to the process of the invention.

As mentioned previously, the present invention provides a stainable plastic sheet material which can be converted to a light polarizer having beneficial light-polarizing and physical characteristics and without need for the pre-casting and lamination of a film of polyvinyl alcohol to the polarizer support material. This is accomplished by employing a combination of particular steps according to certain predetermined relationships, all of which is defined in greater detail hereinafter.

An essential aspect of the present invention involves the employment, as a support for the light polarizer of the invention, of a sheet of amorphous polymeric material. As used herein, an amorphous polymeric material refers to a polymeric material that is substantially amorphous, i.e., a polymeric material which is substantially non-crystalline in form. Such materials are known in the art and are available as materials of commerce. It will be appreciated that the use of a sheet of amorphous polymeric material allows for conversion of the sheet material into a crystalline form according to the particular and predetermined requirements of the light polarizer to be fabricated therefrom.

In general, the amorphous polymeric sheet material will be a flexible and transparent polymeric material obtained by known methodology from a bulk plastic material. The bulk plastic material, typically of a thermoplastic nature, is melted and extruded or otherwise shaped into the form of a flexible sheet material. This can be accomplished, for example, by extruding a molten thermoplastic material onto a chilled roll and allowing the resulting film to cool to a cast polymeric sheet material of amorphous character. The production of amorphous polymeric sheet material is known and constitutes no part of the present invention, such materials being commercially available. Good results can be obtained, for example, using a polymeric sheet of polyester, such as an amorphous sheet of polyethylene terephthalate. Other materials can, however, be employed.

The method of the present invention involves the uniaxial stretching of the amorphous support sheet material in a first direction, followed by the coating of the support sheet with a polyvinyl alcohol-containing coating composition and the stretching of the thus-coated polyvinyl alcohol layer in a second direction. Inasmuch as the principal degree of stretch will be along the second direction, the method of the present invention allows for considerable latitude in the particular nature of the amorphous polymeric support sheet material. Thus, the amorphous sheet material can be formed from thermoplastic bulk materials such as the polystyrenes, polycarbonates, polyacrylic materials and amorphous polyamides which can be fabricated into substantially amorphous sheet materials.

Among preferred materials for use in the production of substantially amorphous polymeric sheet materials are the polyesters which can be readily transformed into flexible, transparent and noncrystalline film materials. The polyesters typically are condensation products of a dicarboxylic acid (or lower alkyl diester thereof) with a glycol. One or more dicarboxylic acids (or alkyl esters), selected from among terephthalic, isophthalic, 2,5-naphthalene dicarboxylic, sebacic, azelaic, biphenic and like acids can be condensed with one or more glycols such as ethylene glycol, diethylene glycol, neopentyl glycol or the like. Suitable polyesters include homopolyesters and copolyesters. Especially useful is a preferred polyester, polyethylene terephthalate, obtained in known manner by the condensation of terephthalic acid and ethylene glycol. Such polyesters can be fabricated by known methods into substantially amorphous sheet forms showing low crystallinity and good transparency and permit the production of light polarizers exhibiting optical efficiency, good strength, durability and other beneficial physical and optical properties.

The amorphous polymeric support sheet material can vary considerably in thickness. In general, the thickness of the starting amorphous sheet material will be dictated largely by the intended application of the light polarizer to be prepared therefrom. For example, amorphous sheet materials having a thickness in the range of from about 0.076 mm to about 1.78 mm can be employed in the practice of the invention, although such materials of other thicknesses could also be used to suit particular requirements. The sheet material is subjected to a uniaxial stretching operation along a first direction. This is accomplished by stretching the sheet material at a temperature which is at or above the glass transition temperature of the amorphous polymeric sheet material. The glass transition temperature of the polymeric sheet material will vary with the particular chemical constitution of the sheet material, and will depend especially on the nature of the various monomeric compounds used in the production of the polymeric sheet material. It will be appreciated that the monomeric content of the polymeric material constituting the support sheet material can be varied in predetermined manner to suit particular requirements. In the case of sheet materials of the preferred polyethylene terephthalate type, the uniaxial stretching operation can be effected at a temperature in the range of from about 80° C. to about 125° C.

The uniaxial stretching operation can be effected by securing the amorphous sheet material in a stretching frame, vise or grip, according to known methodology, and stretching the sheet material (at a temperature at or above the glass transition temperature of the material) along a first direction. In general, it will be desired to stretch the amorphous sheet material in an amount which serves to confer physical strength to the stretched material, and in particular, resistance to stress-induced fracture, cracking or splitting along the stretch direction. Generally, the amorphous sheet material will be stretched to about 175% to about 350% of its original dimension. Preferably, the sheet will be stretched in the first direction to about 200% of its original dimension, i.e., to about two times its original dimension. While the stretching operation imparts crystallinity and strength to the amorphous sheet material, too great an amount of stretch adversely affects the formability of the plastic material. For example, the finished polarizer material may be desirably formed into a curved shape, as by heat forming a lens blank of polarizer material into a sunglass or other shape lens. Accordingly, the amount of stretch employed will be dictated in part by the particular properties desired in the polarizer material and to a degree predetermined to provide the properties required for a particular application.

The uniaxially stretched plastic sheet material is allowed to cool to below the glass transition temperature while in a restrained condition. Typically, the stretched material will be cooled to conditions of ambient temperature and humidity, preparatory to the application of a coating of polyvinyl alcohol-containing composition. The cooling of the uniaxially stretched sheet allows the molecules of the stretched sheet material to crystallize to a stable condition, whereupon, the sheet can be aftertreated.

The stretched and cooled plastic sheet material is provided with a coated film of polyvinyl alcohol (PVA). As indicated previously, application of the PVA layer by a coating step (onto the support sheet material which forms a part of the finished polarizer material) obviates the need to separately form a discrete and self-supporting PVA sheet or film and to then laminate the PVA sheet to the plastic support sheet. The PVA coating operation can be effected by using an aqueous coating composition including PVA in a dispersed condition. Commercially available PVA materials can be used for the preparation of a suitable coating composition which, in general, will be an aqueous composition including the PVA at a solids level of from about 5% to about 15%. Preferably, the solids level of PVA will be in the range of from about 8.5% to about 12.0%.

As is known in the art, polyvinyl alcohol is prepared by the hydrolysis of polyvinyl acetate; and PVA materials may, thus, vary in degree of hydrolysis. In general, from about 98% to 100% of the acetate groups will be converted to hydroxyl groups and PVA materials of this type are generally useful in the process of the present invention. Preferably, the degree of hydrolysis will be in the range of from 98.5% to 99.5%. Good results can be obtained using, for example, an aqueous coating composition containing from about 8.5% to 12.0% by weight of a 99% to 99.5% hydrolyzed polyvinyl alcohol, commercially available as Shin Etsu C-20, from Shin Etsu Chemical Company, Limited. Other PVA materials can, however, be used.

The PVA coating composition can be applied to the uniaxially stretched support sheet material by a variety of coating methods, including spraying, gravure coating, roll coating, squeegee application, slot coating, drawdown coating or the like. The coverage of PVA in the dried coating is not critical. In general, however, the PVA coating will be applied to a dry thickness of about 0.0064 to about 0.0762 mm, and preferably, to a thickness of from about 0.0127 to about 0.0387 mm.

The PVA coating composition can include various agents, if desired, to impart particular and predetermined properties to the PVA layer and to the light polarizer prepared therefrom. Thus, UV stabilizers, cross-linking, plasticizing or other agents can be included to impart improved stability or modify physical properties as desired or as dictated by particular requirements.

In most instances, it will be preferred to apply an adhesive or primer material to the support sheet prior to application of the PVA coating composition to the support sheet. This promotes a more secure bonding of the resulting PVA coated film to the support sheet and enhances stability of the finished polarizer by preventing delamination or like adhesion failures. Any of a variety of known adhesive materials can be used for this purpose, including polyurethane adhesives, nitrile rubber adhesives and like styrene-butadiene copolymeric adhesives, polyesters and the like. Good results can be obtained using a preferred nitrile rubber adhesive. Suitable primer materials include polyvinylidene chloride. Various copolyesters can, for example, be employed and examples of suitable materials of this type are described in the aforementioned U.S. Pat. No. 4,659,523.

The adhesive or primer material employed for securing the coated PVA layer to the support can be applied before or after the uniaxial stretching operation previously described. Thus, if desired, an adhesive such as nitrile rubber can be applied (by any of a variety of known coating methods) to the support sheet which is then uniaxially stretched. The PVA coating composition can then be applied over the adhesive material. Best results are obtained, however, by applying an adhesive or primer material to the sheet material after the uniaxial stretching operation. Application of the PVA coating composition to a support sheet which has been first stretched and then coated with an adhesive or primer layer provides improved adhesion and stability and constitutes a preferred practice.

The PVA-coated sheet material is subjected to a stretching operation for the orientation of the PVA layer and adaptation of the layer to the incorporation of visible dichroism. The stretching operation, as previously indicated, is conducted in a second stretch direction in relation to the uniaxial stretching of the support (in the first direction). The amount of stretch (in the second direction) is an amount sufficient to orient the PVA molecules of the PVA layer to a condition suited to conversion to a light polarizer. This can be accomplished by stretching the PVA-carrying sheet material about 2 to 6 times, i.e., to about 300% to 700% of its original dimension. Preferably, the material will be stretched 3 to 5 times, i,e., to about 400% to 600% of its original dimension, especially 4 times, i.e., to about 500% of its original dimension. Simultaneously with the stretching of the PVA layer, the support material carrying the layer is also stretched. The result of the PVA stretching (orientation) is to confer biaxial orientation and strength to the support material, providing resistance to cracking, splitting and fracture along the second direction. The stretching operation is effected, as in the case of the first stretching, at a temperature at or above the glass transition temperature of the support material. Upon cooling, the stretched stainable sheet material can be rendered visibly dichroic by known methods described hereinafter.

The PVA-coated sheet material is stretched by an amount which is greater than the amount of the first stretch. In addition, the relative directions of stretch for the first and second stretching operations bear an important relation to one another. Referring to FIG. 1, there is shown a schematic representation of various angles defined by first and second directions of stretch. In FIG. 1, the point of intersection of the various lines is designated as X. The line shown as line AB represents arbitrarily the direction (first direction) of a uniaxial stretch applied to a plastic amorphous sheet material. Upon application of a coated layer of PVA, the resulting coated sheet material is stretched along a second direction, for example, along the direction represented by the line EF. It will be seen that the line EF (in relation to an imaginary line NN' representing a normal to the AB-line of the first stretch direction) defines an angle NXF of 45 degrees. This angle ($\alpha$) can be arbitrarily considered an angle of $\pm 45°$ in relation to line NN'. If desired, the second direction of stretch can be effected along the direction of line IJ, in which case, angle NXI represents an angle of $-45°$ in relation to line NN'.

The second stretch can be conducted at various angles with respect to the normal to the first direction of stretch. For example, and as also shown in FIG. 1, the direction of stretch of the second stretching operation can be conducted along line GH (forming an angle NXH of $\pm 60°$ with respect to the normal, NN') or along line MN (forming an angle NXM of $-60°$). If desired, the second direction of stretch can be performed along line CD (forming an angle NXD of $+10°$ with respect to line NN') or along line KL (forming an angle NXK of $-10°$ with respect to the normal, NN'). In general, the second direction of stretch will be at an angle within a range of from $\pm$ about 60 degrees with respect to the normal to the first direction of stretch, and preferably, within the range of about $\pm 10$ degrees. Good results are obtained when the angle is zero degrees, i.e., when the directions of stretch are orthogonal to one another.

Figure 2A:
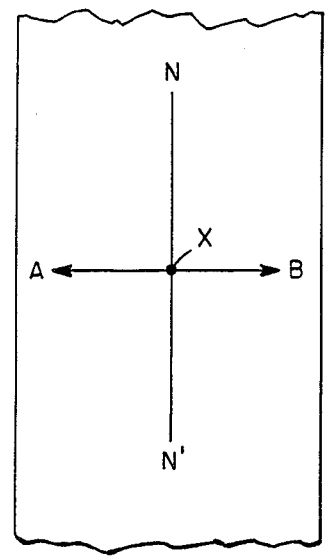
FIGS. 2a, 2b and 2c are diagrammatic representations of relationships between first and second stretch directions, as shown in connection with segments of endless web material for three particular embodiments of the present invention.

As shown in FIG. 1, the angles formed by the intersection of the first and second lines of stretch direction and the line normal to the first direction can extend radially about point X throughout a range of 360 degrees. In practice, it will be convenient to effect the first direction of stretch along a direction having a fixed relation to a particular dimension of the substrate material and to effect the second stretch within $\pm 60$ degrees of the normal to the first direction. Thus, there is shown in FIG. 2a, a segment of endless web material wherein the amorphous sheet material is uniaxially stretched in a first direction along line AB which is in a direction transverse (orthogonal) to the direction of extrusion (the extrusion direction being shown by the arrow in FIG. 2a). Upon application of the PVA coating, the coated web is stretched in a second direction along line NN' which is in the longitudinal or extrusion direction. The angle between the second stretch direction and the normal to the first direction is zero.

Figure 2B:
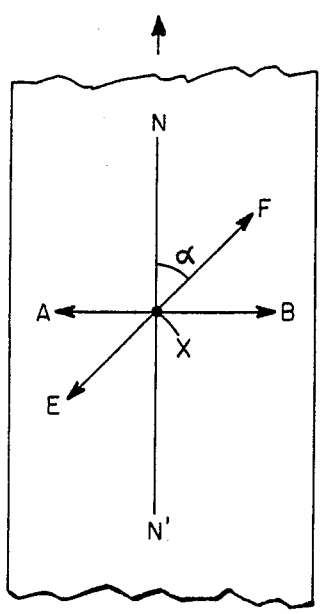
Figure 2C:
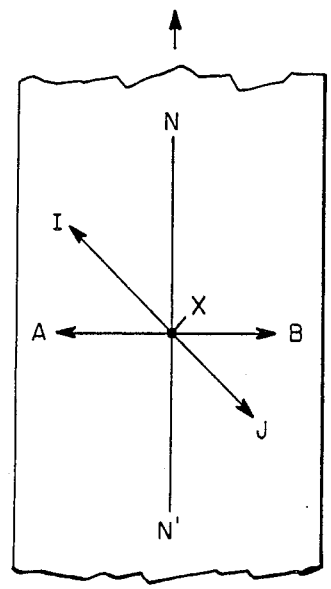

In FIG. 2b, is shown another preferred relationship of stretch directions. As shown, the first direction of stretch is again transverse (orthogonal) to the extrusion (longitudinal) direction. The second stretch direction, along line EF, is at an angle, $\alpha$, of +45 degrees with respect to the normal, line NN'. In FIG. 2c, the first stretch is effected along line AB, while the second direction of stretch (along line IJ) is at an angle of $-45$ degrees with respect to the normal to the first direction. It will be appreciated that the choice of the second stretch direction as plus 45 or minus 45 degrees will depend upon the particular application of the light polarizer to be prepared. For example, a superposed pair of polarizer elements embodying the angular relationships shown in FIG. 2b, placed with the respective PVA light-polarizing layers in face-to-face relation and the supports outermost, provides light extinction. This is also the case with a pair of polarizer elements having the relationships shown in FIG. 2c. A polarizing element as shown in FIG. 2b in superposed relation to a polarizer as shown in FIG. 2c (with respective supports outermost) provides for maximum light transmission.

While the embodiments illustrated in FIGS. 2a through 2c show the stretching of an amorphous sheet material along a first direction AB (in a cross-web orientation) it may be desirable from the standpoint of equipment requirements for cross-web stretching to conduct the first stretching operation at an angle, for example, of 45° from the extrusion direction. Upon application of the PVA-coated layer, a second stretch can then be accomplished, for example, along the extrusion (longitudinal) direction. This can be accomplished by a modification of stretching directions shown in FIG. 2b, using a first stretch along line EF and the second stretch along line NN'. Such a method overcomes difficulties associated with cross-web stretching while providing a strong and non-brittle stainable sheet material.

Other combinations of stretch direction can be used with good results. For example, referring to FIG. 2b, a first stretching operation can be performed along the line NN'. Upon application of a coating of PVA, the sheet can then be stretched along line EF (the angle FXB being an angle of $-45°$ with respect to the normal, AB, to the first direction. Similarly, referring to FIG. 2c, the first stretch can be performed along line NN'; and upon application of a PVA coating, the sheet can be stretched along the line IJ (the angle BXJ being an angle of $+45°$ with respect to the normal, AB, to the first direction.

A particularly preferred manner of practicing the present invention involves stretching the amorphous support material in first and second directions which are approximately orthogonal (i.e., at right angles) to one another. This can be accomplished by stretching in the second direction at an angle of within $\pm$ about 10 degrees from the normal to the first direction, and preferably at an angle of zero degrees. By effecting the two stretching operations along orthogonal directions, or within about ten degrees of orthogonality, there is provided considerable latitude and versatility in application of the polarizer prepared from the stretched sheet material. For example, a single stretch of a preferred polyethylene terephthalate material one time in a first direction and (after coating with PVA) four times in a second direction orthogonal to the first direction (or within about ten degrees of orthogonality), produces a stainable material which can be converted to a light polarizer useful in a given application without regard to the direction from which the polarizer is viewed. The polarizer, thus, functions virtually identically whether viewed from the PVA side or from the support side. Substantial departure from a condition of orthogonality, while producing a useful polarizer, introduces a degree of biaxial orientation in the support material that causes the optical properties of the resulting polarizer to vary as a function of the direction of viewing, thus, requiring that consideration be given to viewing orientation as required in any particular application. From the standpoint of versatility of the light polarizer, it will, thus, be preferred to stretch along mutually orthogonal directions.

The PVA-coated sheet material, after stretching in the second direction, is allowed to cool, while in a restrained condition, to below the glass transition temperature of the support sheet material. Usually the sheet is allowed to cool to ambient conditions of room temperature and humidity. There is provided an oriented stainable PVA material carried on a durable support. As used herein, "stainable" refers to the character of the PVA-coated layer of being capable of conversion to a visibly dichroic material by resort to any of a number of known methods for preparing light-polarizing materials.

The stainable and oriented PVA-carrying sheet material can be stained according to known methods using a dichroic substance such as a dichroic dye or other dichroic stain. An example of a highly suitable dichroic substance is a dichroic stain comprising iodine and an iodide salt such as potassium iodide. A web of stainable sheet material can be passed through a tank containing the iodine/iodide staining composition to effect staining of the oriented PVA layer and to provide a visibly dichroic sheet material. Preferably, the polarizing material will be borated for improved stability using an aqueous borating bath containing boric acid and borax as is known and described in the aforenoted U.S. Re. Patent No. 23,297 (reissued Nov. 28, 1950 to M. Hyman, Jr., et al.).

If desired the stainable sheet material can be rendered dichroic by conversion of the polyvinyl alcohol molecules to polyvinylene light-polarizing species. This can be accomplished using hydrochloric acid vapor processing in known manner and as described in U.S. Pat. No. 2,445,555 (issued July 20, 1948 to F. J. Binda). Preferably, such polarizing material will also be borated for improved stability.

The stainable sheet material can be rendered dichroic by resort to materials and methods other than those described in connection with iodine stained and polyvinylene polarizers. Other dichroic materials can be employed, particularly the dichroic dyes and other stains disclosed in U.S. Pat. No. 2,237,567 (issued Apr. 8, 1941 to E. H. Land) and in U.S. Pat. No. 2,328,219 (issued Aug. 31, 1943 to E. H. Land).

It will be understood that the amorphous polyester material utilized for the production of a light polarizer of the present invention becomes biaxially oriented as a consequence of the combined effects of a first uniaxial stretch before application of the PVA coated layer and the subsequent and second stretching operation used to orient the PVA layer. The relative degrees of stretch employed in the first and second stretching operations can, however, be controlled to provide a polarizer material which has good resistance to cracking while not being strengthened by biaxial stretching to the point of substantial loss of heat formability. Thus, a first stretch of one time the original dimension, using a polyethylene terephthalate, and a second orthogonal stretch (after PVA application) of four times the original dimension conveniently provides a light polarizer material that can be heat shaped at temperatures below 100° C. for production of curved lens elements suited for sunglass applications.

The following Examples are illustrative of the present invention. It will be understood, however, that such Examples are not intended to be limitative of the present invention.

EXAMPLE 1

This Example illustrates the production of a stainable, oriented PVA-carrying sheet material and the production of a light polarizer therefrom, using an iodine/iodide staining method.

An elongated sheet of amorphous polyethylene terephthalate (of a thickness of 1.27 mm) was coated with a layer of nitrile rubber adhesive (an acrylonitrile/butadiene copolymer, available as Bostik S-188-515 Breon Rubber from Bostik Division of Emhart Corporation, Middleton, Mass.) to a thickness of approximately 0.0064 mm to 0.0254 mm. The adhesive coating was dried in a low air-velocity oven, for two to three minutes to 74° C. The resulting sheet material was then stretched in a linear or cross-web direction one time its original dimension, in a high air-velocity oven at 120° C. and the stretched sheet was allowed to cool to ambient room conditions while still in a restrained condition. The stretched sheet was then coated with a layer (to about 0.0254 to 0.0381 mm dry thickness) of an aqueous composition containing ten percent by weight of polyvinyl alcohol (Shin Etsu C-20 polyvinyl alcohol, Shin-Etsu Chemical Co., Ltd.) and approximately 0.75% hydrochloric acid. The coated PVA layer (over the nitrile rubber adhesive layer) was dried for approximately five minutes in a low air-velocity oven at 74° C. The resulting PVA-carrying sheet material was then stretched approximately three times its length dimension (to 400% of its original length dimension) orthogonally to the first stretch direction, i.e., at an angle of zero degrees from a normal to the first stretch direction. The stretching operation was conducted at 20° C. in a high air-velocity oven and the stretched sheet was allowed, while still restrained, to cool to ambient room conditions. The resulting biaxially stretched sheet material was imbibed for about fifteen seconds in an aqueous staining bath heated to 35° C. and containing 6.0% by weight potassium iodide and 0.9% iodine. The stained sheet material was water rinsed and then imbibed in an aqueous bath, heated to about 74° C., containing about 9.0% boric acid and 0.1% potassium iodide. Excess borating bath material was water washed from the sheet material and the resulting film was dried at 74° C. The resulting material was a visibly dichroic light polarizer. Lens blanks cut from the sheet material were evaluated by bending along each stretch direction. No splitting, cracking or fracturing was observed along either stretch direction.

COMPARATIVE EXAMPLE 1

For purposes of comparison with the sheet material prepared in the manner described in Example 1, an amorphous sheet material (as described in Example 1) was treated in the same manner as described in Example 1, except that, the step of cross-web stretching was omitted. That is, the PVA-coated layer, adhesively bonded to the amorphous sheet material, was stretched only once, along its length, by three times its length dimension (to 400% of its original length). Light polarizer sheet material and lens blanks therefrom fractured along the stretch direction when bent (folded) along the stretch direction.

EXAMPLE 2

This Example illustrates the production of a stainable, oriented PVA-containing sheet material and the production of a light polarizer therefrom, using a hydrochloric acid dehydration process for production polyvinylene light-polarizing species.

An elongated sheet of amorphous polyethylene terephthalate (of a thickness of 1.27 mm) was coated with a layer of nitrile rubber adhesive (acrylonitrile/butadiene copolymer, Bostik S-188-515 Breon Rubber) to a thickness of about 0.0064 to 0.0254 mm. The adhesive coating was dried in a low air-velocity oven, for two to three minutes to 74° C. The resulting sheet material was then stretched in a linear or cross-web direction one time its original dimension, at a rate of 38.1 mm/sec., in a high air-velocity oven at 120° C. and the stretched sheet was allowed to cool to ambient room conditions while still in a restrained condition. The stretched sheet was then coated with a layer (to about 0.0254 to 0.0381 mm dry thickness) of an aqueous composition containing ten percent by weight of polyvinyl alcohol (Shin Etsu C-20 polyvinyl alcohol, Shin-Etsu Chemical Co., Ltd.) and approximately ten percent hydrochloric acid. The coated PVA layer (over the nitrile rubber adhesive layer) was dried for approximately five minutes in a low air-velocity oven at 74° C. The resulting PVA-carrying sheet material was then stretched approximately three times its length dimension (to 400% of its original length dimension) orthogonally to at first direction of stretch, i.e., at an angle of zero degrees from a normal to the first stretch direction and at a rate of 38.1 mm/sec. The stretching operation was conducted at 120° C. in a high air-velocity oven and the stretched sheet was allowed, while still restrained, to cool to ambient room conditions. The resulting biaxially stretched sheet material was then imbibed for about 45 seconds in an aqueous solution, heated to 74° C. and containing 3.0% by weight borax and 9.0% boric acid. Excess borating bath material was water washed from the sheet material and the resulting film was dried at 74° C. The resulting material was a visibly dichroic light polarizer. Lens blanks cut from the sheet material were evaluated by bending along each stretch direction. No splitting, cracking or fracturing was observed along either stretch direction.

COMPARATIVE EXAMPLE 2

For purposes of comparison with the sheet material prepared in the manner described in Example 2, an amorphous sheet material (as described in Example 2) was treated in the same manner as described in Example 2, except that, the step of cross-web stretching was omitted. That is, the PVA-coated layer, adhesively bonded to the amorphous sheet material, was stretched only once, along its length, by three times its length dimension (to 400% of its original length). Light polarizer sheet material and lens blanks prepared therefrom fractured along the stretch direction when bent (folded) along the stretch direction.

EXAMPLE 3

A light polarizer was prepared in the manner described in EXAMPLE 1, except that, the second direction of stretching was performed at an angle of 45° to the normal to the first direction. The resulting light polarizer exhibited good light-polarizing properties and resistance to splitting, cracking or fracturing when bent (folded) along either stretch direction.

EXAMPLE 4

A light polarizer was prepared in the manner described in EXAMPLE 2, except that, the second direction of stretching was performed at an angle of 45° to the normal to the first direction. The resulting light polarizer exhibited good light-polarizing properties and resistance to splitting, cracking or fracturing when bent (folded) along either stretch direction.

What is claimed is:

1. A method for preparing a stainable polymeric sheet article adapted to the production of a light polarizer therefrom, the method comprising the steps of:
   providing a support sheet of amorphous polymeric material;
   uniaxially stretching the amorphous polymeric support sheet in a first direction and at a temperature at or above the glass transition temperature of the polymeric support sheet material, to partially orient the molecules of the polymeric support sheet material along said first direction;
   applying a coating of an aqueous polyvinyl alcohol-containing composition to the surface of the uniaxially stretched polymeric support sheet; and
   stretching the polyvinyl alcohol-coated uniaxially stretched polymeric support sheet at a temperature at or above the glass transition temperature of the polymeric support sheet material and in a second direction of stretch;
   said second direction of stretch being at an angle within about ±60 degrees from a normal to said first direction of stretch;
   the amount of stretch along said first direction being sufficient to impart to the polymeric support sheet, resistance to stress-induced fracture along said first direction, and the amount of stretch along said second direction being sufficient to simultaneously orient the molecules of said polyvinyl alcohol layer to thereby adapt the layer to incorporation of visible dichroism, and to impart to the support layer, resistance to stress-induced fracture along said second direction.

2. The method of claim 1 wherein said amorphous polymeric support sheet is stretched along said first direction to about 175% to about 350% of its original dimension.

3. The method of claim 2 wherein said polyvinyl alcohol-coated uniaxially stretched polymeric support sheet is stretched in said second direction to about 300% to about 700% of its original dimension.

4. The method of claim 2 wherein said polyvinyl alcohol-coated uniaxially stretched polymeric support sheet is stretched in said second direction to about 400% to about 600% of its original dimension.

5. The method of claim 1 wherein second direction of stretch is at an angle of about ±45 degrees with respect to a normal to said first direction.

6. The method of claim 5 wherein said angle is within about ± ten degrees with respect to a normal to said first direction.

7. The method of claim 6 wherein said angle is zero degrees.

8. The method of claim 1 wherein said support sheet of amorphous polymeric material comprises a polyester.

9. The method of claim 8 wherein said polyester is polyethylene terephthalate and each of said first and second stretching steps is conducted at a temperature in the range of 80° C. to 125° C.

10. The method of claim 1 wherein said polyvinyl alcohol-containing composition is applied to said uniaxially stretched polymeric support sheet to a dry thickness of from about 0.0064 mm to about 0.0762 mm.

11. The method of claim 10 wherein the solids level of polyvinyl alcohol in said aqueous polyvinyl alcohol-containing composition is in the range of from about 5% to about 15%.

12. The method of claim 11 wherein said solids content is in the range of from about 8.5% to about 12%.

13. The method of claim 12 wherein the degree of hydrolysis of said polyvinyl alcohol in said aqueous polyvinyl alcohol-containing composition is in the range of from 98.5% to 99.5%.

14. The method of claim 1 wherein after said step of uniaxially stretching the amorphous polymeric support sheet, and before said step of applying said coating of polyvinyl alcohol, an adhesive or primer layer is applied to said polymeric support sheet.

15. The method of claim 1 additionally including the step of incorporating visible dichroism into said polyvinyl alcohol layer to provide a light polarizer.

16. A stainable polymeric sheet article adapted to the production of a light polarizer therefrom, said polymeric sheet article comprising:

a biaxially oriented polymeric support sheet carrying a coated layer of polyvinyl alcohol;

said biaxially oriented polymeric support sheet having biaxial orientation resulting, in part, from the uniaxial stretching of an amorphous polymeric support sheet prior to the application of said coated polyvinyl alcohol layer thereon, said uniaxial stretching being along a first direction, and, in part, as an incident to the subsequent stretching and orientation, along a second direction, of said coated polyvinyl alcohol layer carried on said uniaxially stretched polymeric support sheet;

said stretching of said coated polyvinyl alcohol layer along said second direction being at an angle within about ±60 degrees from a normal to said stretching along said first direction;

the amount of stretch along said first direction being sufficient to impart to the polymeric support sheet, resistance to stress-induced fracture along said first direction, and the amount of stretch along said second direction being sufficient to simultaneously orient the molecules of said polyvinyl alcohol layer and thereby adapt the layer to incorporation of visible dichroism, and to impart to the support layer, resistance to stress-induced fracture along said second direction.

17. The stainable polymeric sheet article of claim 16 wherein said biaxial orientation of said support is the result of stretching along first direction to about 175% to about 350% of the original first dimension and stretching along said second direction to about 300% to about 700% of the original second dimension.

18. The stainable polymeric sheet article of claim 17 wherein said first stretching is to about 200% of said first dimension and said second stretching is to about 500% of said second dimension.

19. The stainable polymeric sheet article of claim 18 wherein said biaxially oriented support material comprises polyethylene terephthalate.

20. The stainable polymeric sheet article of claim 17 wherein said second direction of stretch is at an angle of about 45 degrees to a normal to said first direction of stretch.

21. The stainable polymeric sheet article of claim 17 wherein said second direction of stretch is at an angle of zero degrees with respect to a normal to said first direction of stretch.

22. The stainable polymeric sheet article of claim 16 wherein said polyvinyl alcohol layer is visibly dichroic.

* * * * *